US009618394B2

(12) United States Patent
Campbell (10) Patent No.: US 9,618,394 B2
(45) Date of Patent: Apr. 11, 2017

(54) MONITORING THE CONDITION OF DRIVE BELTS IN BELT DRIVEN MACHINES

(71) Applicant: Razorback Technology LLC, Paul, ID (US)

(72) Inventor: Jorden Campbell, Paul, ID (US)

(73) Assignee: Razorback Technology LLC, Paul, ID (US)

(*) Notice: Subject to any disclaimer, the term of this patent is extended or adjusted under 35 U.S.C. 154(b) by 0 days.

(21) Appl. No.: 14/692,594

(22) Filed: Apr. 21, 2015

(65) Prior Publication Data

US 2016/0313186 A1  Oct. 27, 2016

(51) Int. Cl.
*G01J 5/02* (2006.01)
*G01N 35/04* (2006.01)
*G01J 5/00* (2006.01)

(52) U.S. Cl.
CPC ............... *G01J 5/02* (2013.01); *G01J 5/0022* (2013.01)

(58) Field of Classification Search
CPC . G01N 35/04; B66B 31/02; A61L 2/10; G01J 5/02
See application file for complete search history.

(56) References Cited

U.S. PATENT DOCUMENTS

| 4,691,987 A * | 9/1987 | Ebner ................... G02B 6/4249 156/158 |
| 7,932,081 B2 * | 4/2011 | Lair ...................... C12Q 1/6851 250/459.1 |
| 2003/0160156 A1 * | 8/2003 | Duhamel ............... B65H 20/06 250/223 R |
| 2010/0290796 A1 * | 11/2010 | Sato .................... G03G 15/2039 399/33 |
| 2015/0028228 A1 * | 1/2015 | Almasy ..................... A61L 2/10 250/492.1 |

FOREIGN PATENT DOCUMENTS

CN          202687406 U  *  1/2013
DE     102010038817 A1 *  2/2012  ............. B65G 43/02

* cited by examiner

*Primary Examiner* — David Porta
*Assistant Examiner* — Faye Boosalis
(74) *Attorney, Agent, or Firm* — Terrence J. Edwards; TechLaw Ventures, PLLC (57) ABSTRACT

The disclosure extends to systems, methods, and apparatuses for monitoring the condition and temperature of belts in belt driven machines, and for determining maintenance plans for the belt driven machines.

22 Claims, 9 Drawing Sheets

MONITORING THE CONDITION OF DRIVE BELTS IN BELT DRIVEN MACHINES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

Belt driven machines and vehicles have become increasingly popular as advances in belt materials and design have resulted in long lasting drive belts that provide predictable operational characteristics combined with low maintenance requirements. Recreational vehicles, for example, are increasingly employing belts as the primary means for driving the vehicle. Snowmobiles, all-terrain vehicles, side-by-sides, and even street motorcycles are often fitted with belt drives. Belts can fail over time due to use, and, depending on how and under what conditions the belt is used, they will require replacement at certain intervals. It will be appreciated that a drive belt may damage a machine and/or its engine when the belt breaks or otherwise fails. Thus, as a preventative measure, belts should be inspected, maintained, or replaced at regular intervals depending upon the condition of the belts. However, too often such belts are not properly inspected, maintained or replaced at regular intervals, thereby leaving a user/operator of the machine at potential risk of belt failure during use and collateral damage to the machine and/or engine.

What is needed are methods and systems that are efficient at monitoring the condition of drive belts during use, and providing data that will aid users in predicting when the drive belts will need replacement, adjustment, and maintenance. As will be seen, the disclosure provides such methods and systems that can monitor belt conditions and maintenance needs in an effective and elegant manner.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

The disclosure extends to methods, systems, and apparatuses for monitoring the condition and temperature of belts in belt driven machines, and for determining maintenance plans for the belt driven machines. In the following description of the disclosure, reference is made to the accompanying drawings, which form a part hereof, and in which is shown by way of illustration specific implementations in which the disclosure is may be practiced. It is understood that other implementations may be utilized and structural changes may be made without departing from the scope of the disclosure.

The disclosure below offers improvements for any belt driven pulley system or belt conveyor system. Belts in such systems undergo temperature extremes that cause wear to the belts that will ultimately result in failure if not replaced. Disclosed below are systems, components, and methods for sensing the thermal radiation, most often in the form of electromagnetic radiation from within the infrared spectrum. It should be noted, that any spectrum of electromagnetic radiation may be sensed, but for this exemplary embodiment the infrared spectrum has been chosen because infrared radiation is less affected by the ambient temperatures of the surrounding area.

Figure 1:
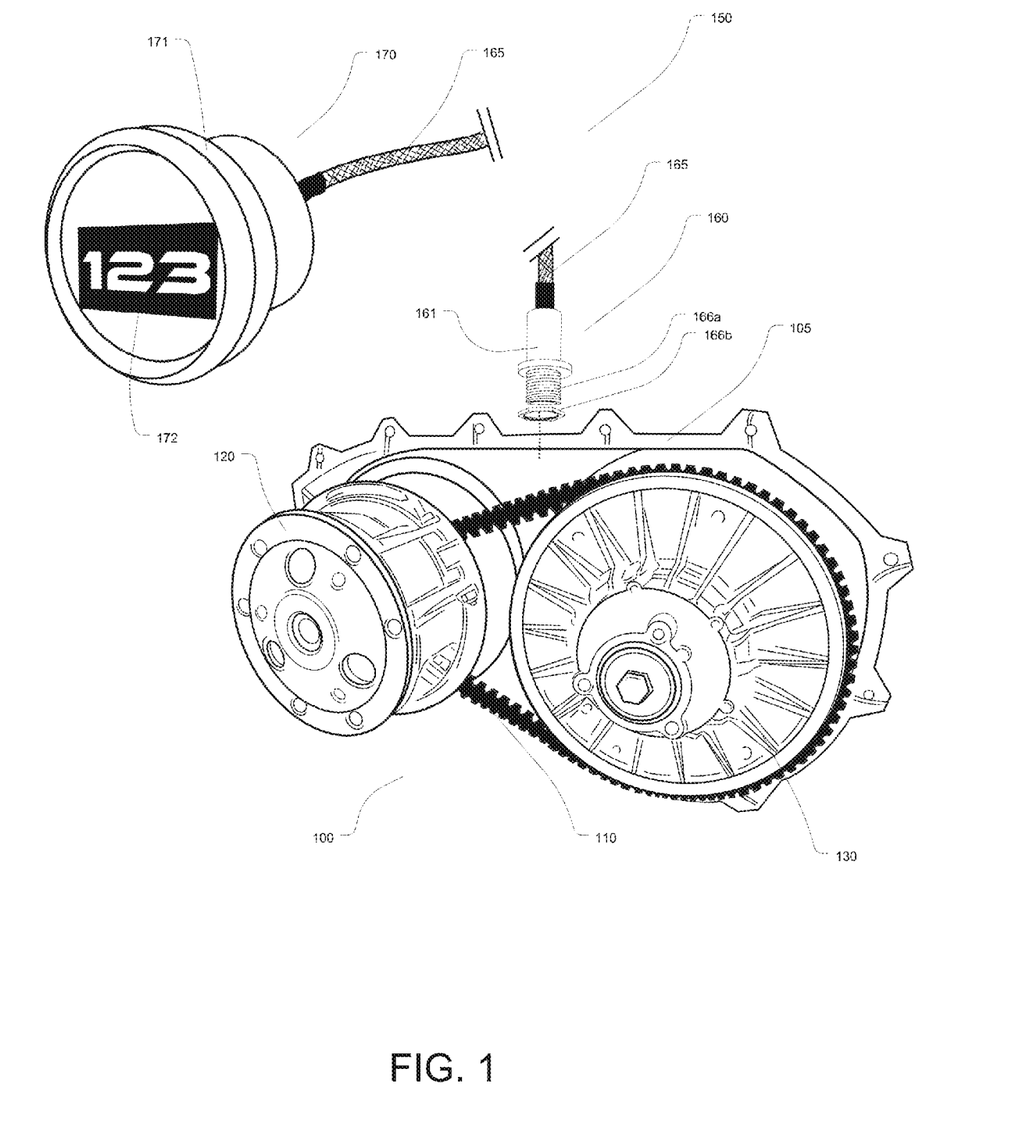
FIG. 1 illustrates an embodiment of a belt monitoring system in accordance with the teachings and principles of the disclosure.
Figure 2:
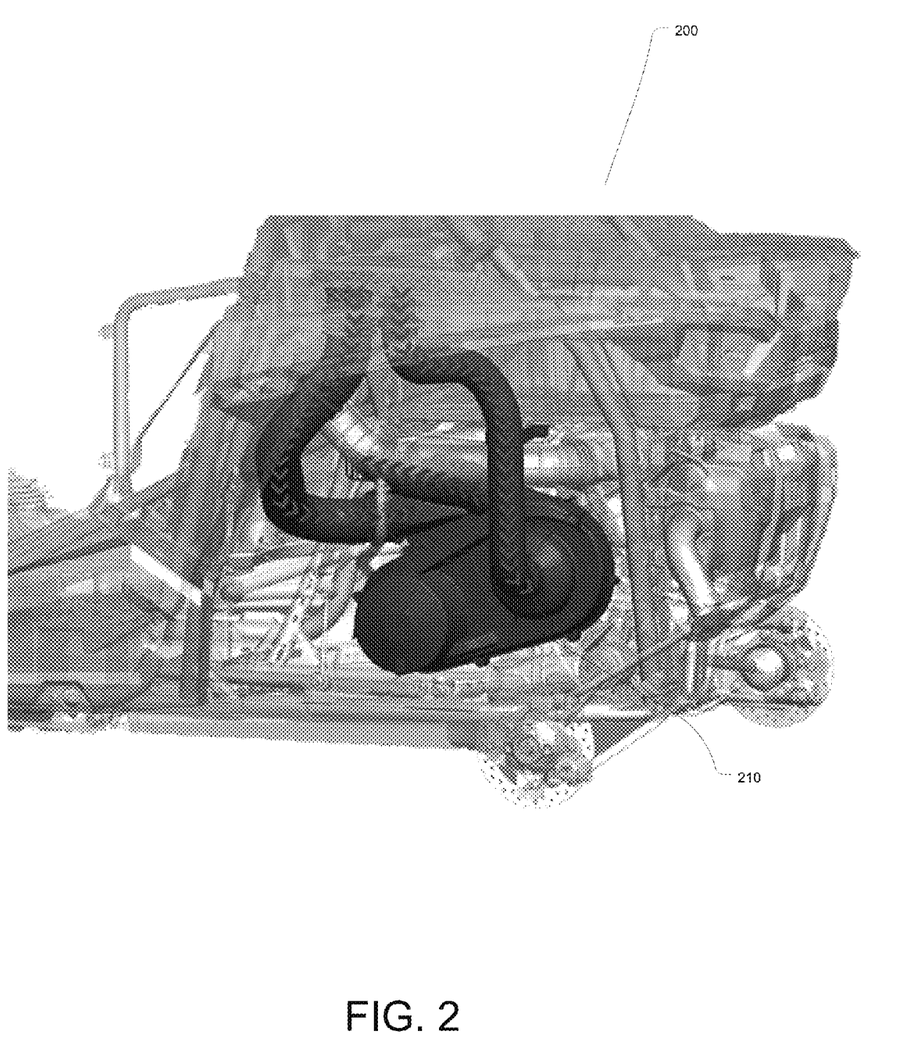
FIG. 2 illustrates an embodiment of a belt monitoring system as disposed on a belt driven vehicle in accordance with the teachings and principles of the disclosure.

Referring now to FIGS. 1 and 2, FIG. 1 illustrates an embodiment of a system for monitoring the operating temperature of drive belts during their use. An example of a belt driven vehicle is illustrated in FIG. 2, which shows a rear section of a semi-transparent rendition of a side-by-side land traveling vehicle. As can be seen in FIG. 1, a belt drive 100 may comprise a primary drive cover 105 that covers and provides protection for the drive belt 110, which mechanically transfers power from the transmission/clutch output 120 to final drive components 130. As illustrated, a belt monitoring system 150 may comprise a sensor package 160 and a readout portion 170. It will be appreciated that the sensor package 160 may be remotely located from the readout portion 170. Additionally, communication between the sensor package 160 and the readout portion 170 may be facilitated by a wired communication connection 165. It should be noted, that the readout portion 170 and the sensor package 160 may be directly connected to each other via a wired connection.

In an embodiment, the sensor package 160 may electronically communicate with the readout (control unit) portion 170 via a vehicle network (not shown), wherein the vehicle network comprises routing functionality for the components connected to it, much like a typical wiring harness used for many years in the auto industry.

In an embodiment, the readout portion 170 may be integrated into the native electronic displays of the host belt-driven vehicle, and may not require a separate dedicated readout portion and display. The readout portion 170 may comprise a readout housing 171 that houses circuitry and display components, such as a gauge or digital screen 172. The readout housing 171 may further comprise weather protection seals to protect the components contained within it from environmental conditions.

The sensor package 160 may comprise a sensor housing 161 that houses a sensor (not shown in FIG. 1 or 2). The sensor housing 161 may be configured for being attached to the belt drive cover 105 and may operate to position the sensor adjacent to the belt 110 in a desirable orientation to thereby provide accurate readings. The sensor housing 161 may comprise attachment structures 166*a* and 166*b* that provide the ability to attach the sensor package 161 to the belt drive cover 105. The attachment structures 166*a* and 166*b* may be threads and corresponding threaded nuts, for example, but it will be appreciated that any attachment structures may be used without departing from the scope of the disclosure.

The sensor housing 161 may be constructed from a single material or may be constructed from a plurality of materials. For example, the sensor housing 161 may be made of aluminum, steel, brass, and/or plastics. In an implementation, the sensor housing 161 may be made of a thermally conductive material that will transfer heat away from the sensor and other components that are contained within the sensor housing 161. It will be appreciated by those skilled in the art that the consistent and accurate function of the sensor may be enhanced by keeping the sensor at a consistent operating temperature. Accordingly, in certain embodiments materials that provide thermal regularity for the sensor may be chosen or selected for the construction of the sensor housing 161. For example, certain implementations of common infrared sensors sense temperature that range from negative 40 degrees Fahrenheit to positive 600 degrees Fahrenheit.

FIG. 2 illustrates an exemplary belt drive 210 disposed within the rear section of a belt driven vehicle 200. It will be appreciated that any type of belt driven machine may benefit from a belt monitoring system as disclosed herein, such as, for example: snowmobiles, ATVs, conveyor belt systems, side-by-side vehicles, motorcycles, boats, milling machines, to name a few.

Figure 3:
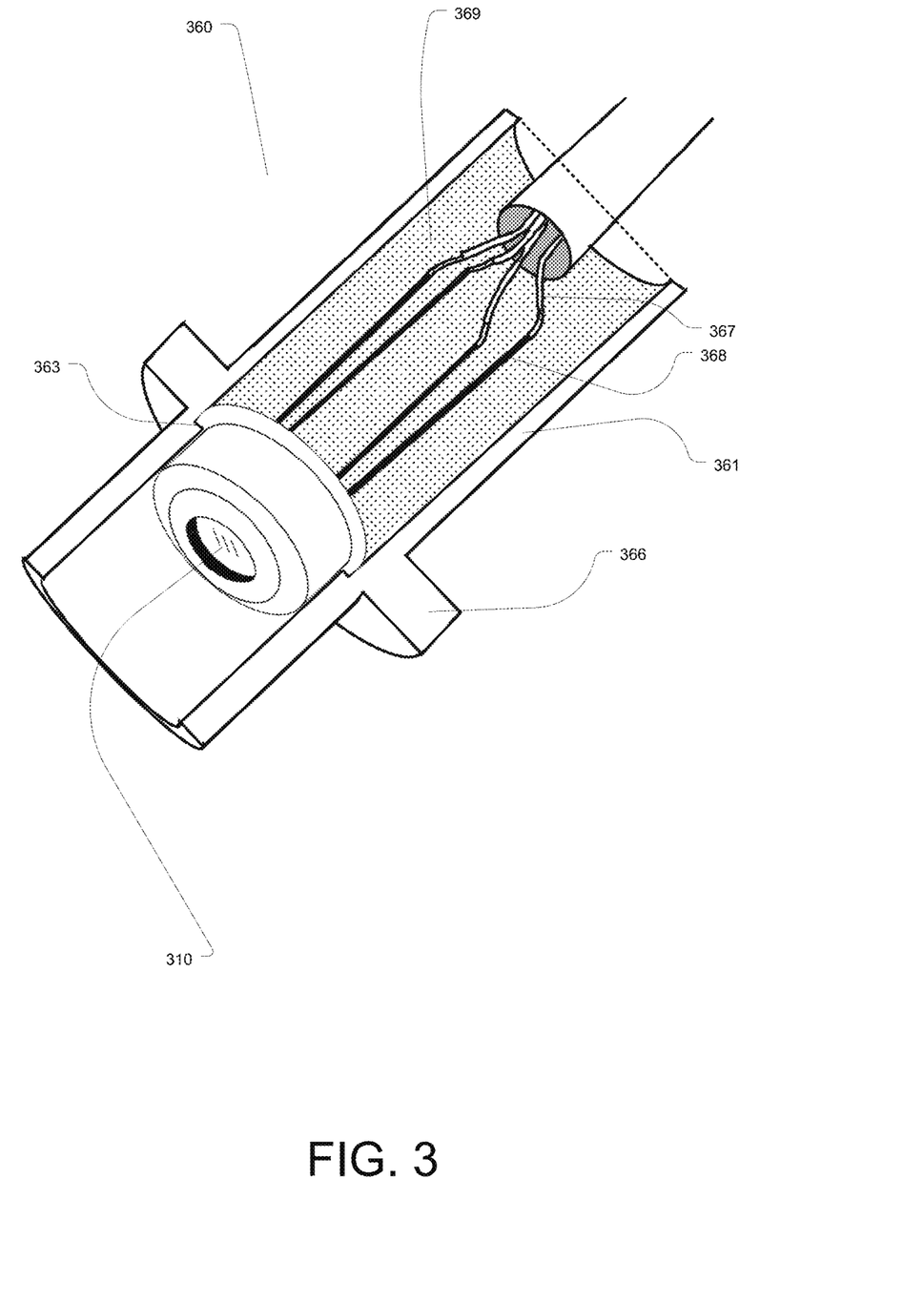
FIG. 3 illustrates an embodiment of a sensor package of a belt monitoring system in accordance with the teachings and principles of the disclosure.

FIG. 3 illustrates a cut away view of a sensor package 360. As seen in the illustration the sensor package 360 may comprise a sensor 310 disposed within a sensor housing 361. The sensor housing 361 may be configured for attaching to a belt drive cover (illustrated best in FIG. 1 and FIG. 2) and position the sensor adjacent to the belt in a desirable orientation for providing accurate readings of the belt operating temperatures. The sensor housing 361 may comprise an attaching structure 366 that provides the ability to attach the sensor package 361 properly to a belt drive cover, such as cover 105. The attachment structure 366 may be a simple shoulder that prevents the sensor package 360 from falling into the belt drive mechanism or the attachment structure may be another mechanism that prevents the sensor package 360 from falling into the belt drive mechanism without departing from the scope of the disclosure. The sensor housing 361 may be constructed from a single material or may be constructed from a plurality of materials. For example, the sensor housing 361 may be made of aluminum, steel, brass, and/or plastics. In an implementation, the sensor housing 361 may be made of a thermally conductive material that will transfer heat away from the sensor and other components contained within the sensor housing 361 without departing from the scope of the disclosure.

In an implementation, the sensor housing 361 may comprise an internal lip 363 for preventing the sensor 310 from moving forward in the housing 361. It will be appreciated that the lip 363 may interact with a corresponding lip on the sensor 310 to thereby prevent the sensor 310 from moving forward in the housing 361. The lip of the sensor 310 may abut or otherwise interact with the lip 363 to prevent movement of the sensor 310 within the housing 361.

In an implementation, the sensor housing 361 may be filled with thermally conductive epoxy 369 (shown by the dotted lines of FIG. 3) to provide for increased heat transfer. The epoxy 369 may work in conjunction with the lip 363 of the housing 361 to prevent movement of the sensor 310 within the housing 361. It will be appreciated by those skilled in the art that consistent and accurate function of the sensor 310 may be enhanced by keeping the sensor 310 at a consistent operating temperature. Therefore, in certain embodiments, materials that provide thermal regularity for the sensor 310 may be chosen or selected for the sensor housing 361 construction. For example, certain implementations of common infrared sensors sense temperature ranges from about −40 degrees Fahrenheit to about 600 degrees Fahrenheit. Additionally, it will be appreciated that the thermally conductive epoxy 369 may be electrically insulating so as to allow its application to electronic components, such as sensor leads 368 and wires 367. The conductive epoxy 369 may further operate and serve to hold the sensor 310 in place within the sensor housing 361, and seal the sensor 310 away from contaminates and moisture.

Figure 4:
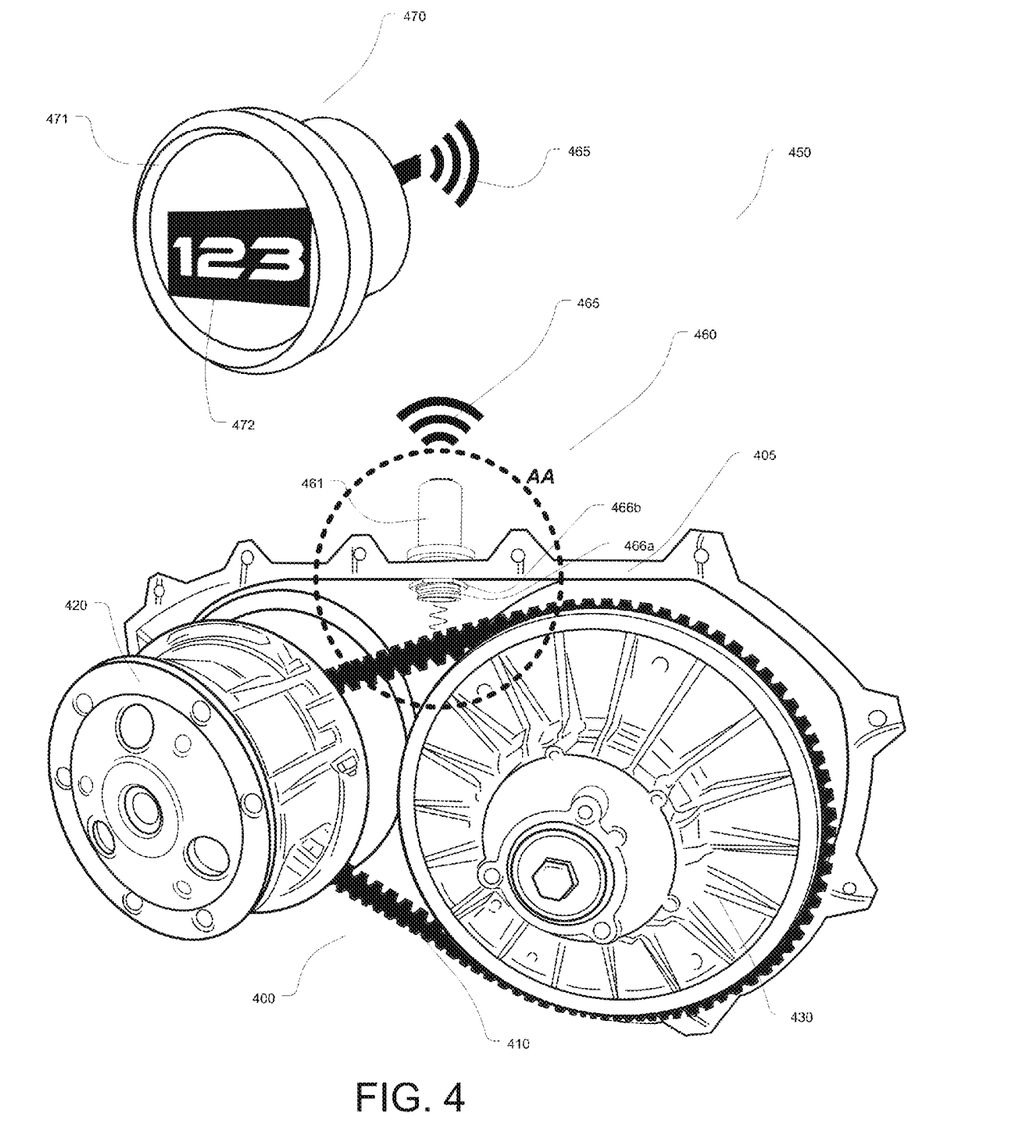
FIG. 4 illustrates an embodiment of a belt monitoring system according to one implementation having wireless functionality consistent with the teachings and principles of the disclosure.

Referring now to FIG. 4, an embodiment of a wireless system for monitoring the operating temperature of a drive belt during its use will be discussed as employed in a belt driven vehicle, such as the one illustrated in FIG. 2. As can be seen in FIG. 4, a belt drive 400 may comprise a primary drive cover 405 that covers and provides access to the belt 410, which mechanically transfers power from the transmission and clutch output 420 to the final drive components 430. As illustrated, the belt monitoring system 450 may comprise a sensor package 460 and a readout portion 470. The sensor package 460 may be remotely located from the readout portion 470. In the figures, infrared radiation is illustrated by the wavy line disposed between the top of the drive belt 410 and the bottom of the sensor housing 461. Additionally, communication between the sensor package 460 and the readout portion 470 may be facilitated by a wireless connection 465. It should be noted that the readout portion 470 and the sensor package 460 may be directly connected to each other via a wireless protocol shared between them in one embodiment. In another embodiment, the sensor package 460 may electronically communicate with the readout portion 470 via a vehicle wireless network (not shown), wherein the vehicle network comprises routing functionality for any components that are connected to it.

Figure 5:
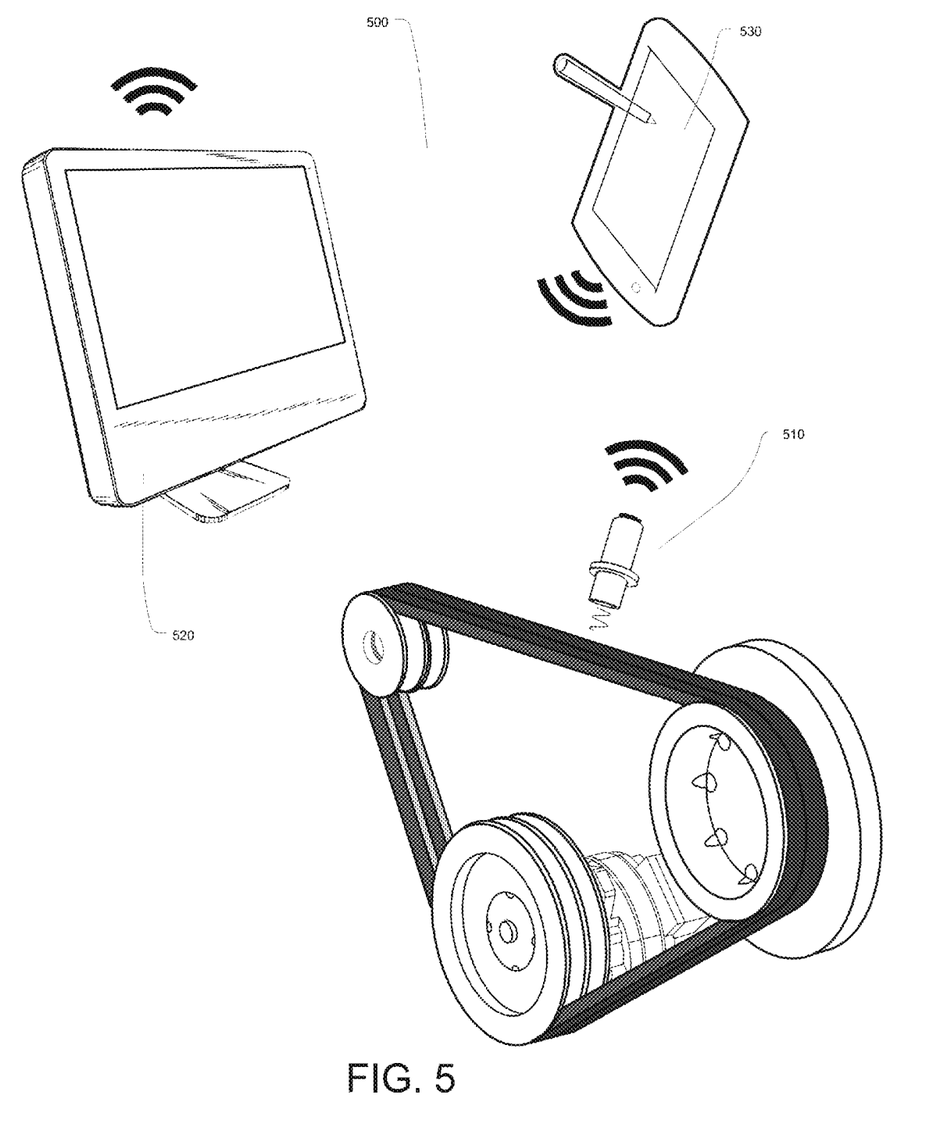
FIG. 5 illustrates an embodiment of a network level belt monitoring system according to one implementation of the disclosure and consistent with the teachings and principles of the disclosure.

In an implementation, the wireless protocol use may be short range secured wireless protocol such as, for example, Bluetooth. In another implementation, communication may be facilitated via medium range wireless protocol, such as the various Wi-Fi standards. It should be noted that hardware associated with the various wireless protocols, such as transceivers, antenna, and chipsets may be located within the sensor housing 461 and the readout housing 471. An implementation may comprise a plurality of wireless protocols and associated hardware as illustrated in FIG. 5.

In an embodiment, the readout portion 470 may be integrated into the native electronic displays of the host belt driven vehicle, and may not require a separate dedicated readout portion. In an embodiment the readout portion 470 may comprise a readout housing 471 that houses circuitry and display components, such as a gauge or digital screen 472. The readout housing 471 may further comprise weather protection seals (not shown) to protect the components within the housing 471.

In an implementation, the sensor package 460 may comprise a sensor housing 461 that houses a sensor (not shown in FIG. 4). The sensor housing 461 may be configured for being attached to the belt drive cover 405 and to position the sensor adjacent and substantially perpendicular to a surface of the belt 410 in a desirable orientation for providing accurate readings. The sensor housing 461 may comprise attaching structures 466a and 466b that provide the ability to attach the sensor package 460 to the belt drive cover 405. The attachment structures 466a and 466b may be threads and corresponding threaded nuts, for example, but it will be appreciated that any attachment structures may be used without departing from the scope of the disclosure.

Figure 7:
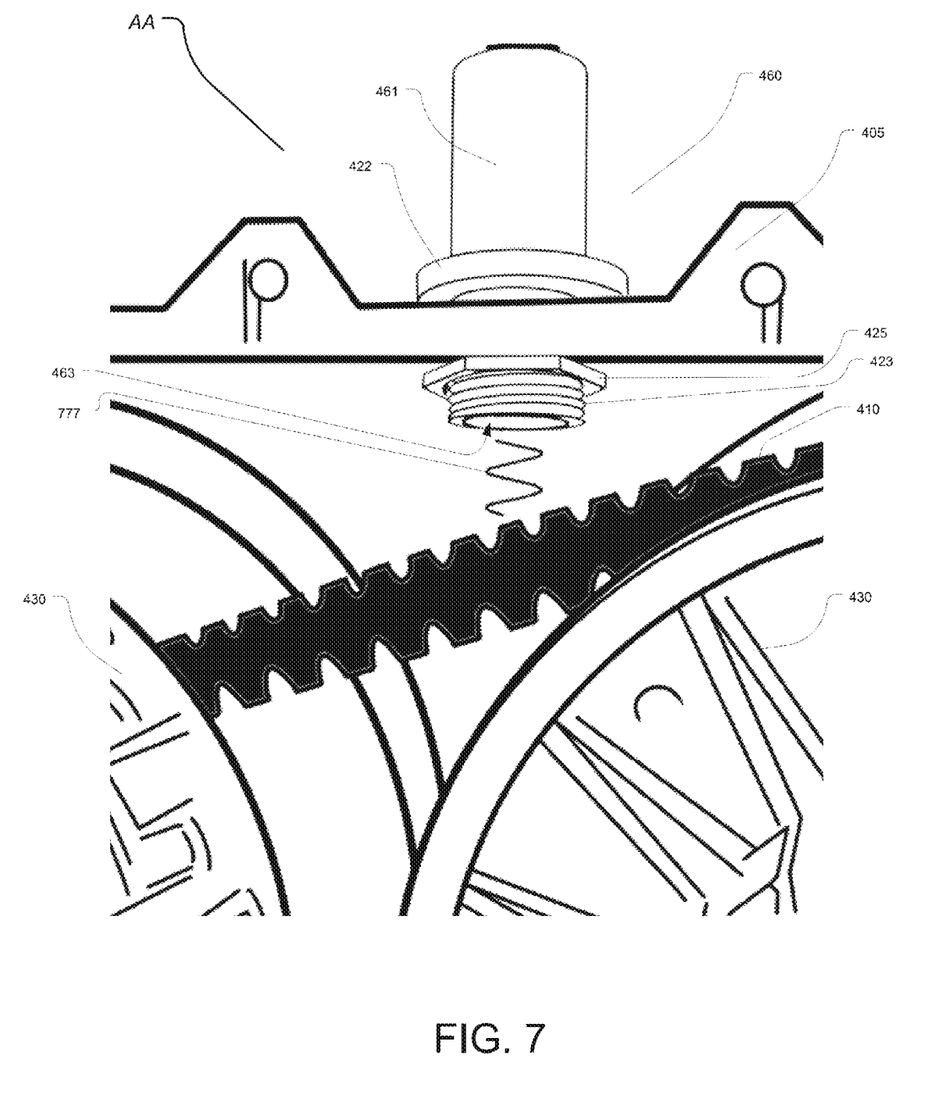
FIG. 7 illustrates a detailed view of an embodiment of a belt monitoring system according to one implementation in accordance with the teachings and principles of the disclosure.

As can be seen in FIG. 4, the sensor housing 461 may be configured to pass through an opening in the belt drive cover 405. The mounting positions of the sensor package 460 will be discussed in greater detail in relation to FIG. 7 and accompanying disclosure. The disclosure of FIG. 7 is in reference to the Detailed Section AA as shown by a dashed circle in FIG. 4.

The sensor housing 461 may be constructed from a single material or may be constructed from a plurality of materials. For example, the sensor housing 461 may be made of aluminum, steel, brass, and/or plastics. In an implementation, the sensor housing 461 may be made of a thermally conductive material that will transfer heat away from the sensor and other components contained within the sensor housing 461. It will be appreciated by those skilled in the art that consistent and accurate function of the sensor may be enhanced by keeping the sensor at a consistent operating temperature. Therefore, in certain embodiments materials that provide thermal regularity for the sensor may be chosen or selected for the sensor housing construction.

Referring now to FIG. 5, illustrated is a belt drive monitoring system 500 that is wireless. In the wireless belt drive monitoring system 500, the sensor package 510 may be in communication with a plurality of readout devices, such as a computer 520 and a mobile device 530. In an implementation, the sensor package 510 may be configured to communicate in a plurality of wireless protocols simultaneously, including those protocols discussed previously in connection with FIG. 4.

Figure 6A:
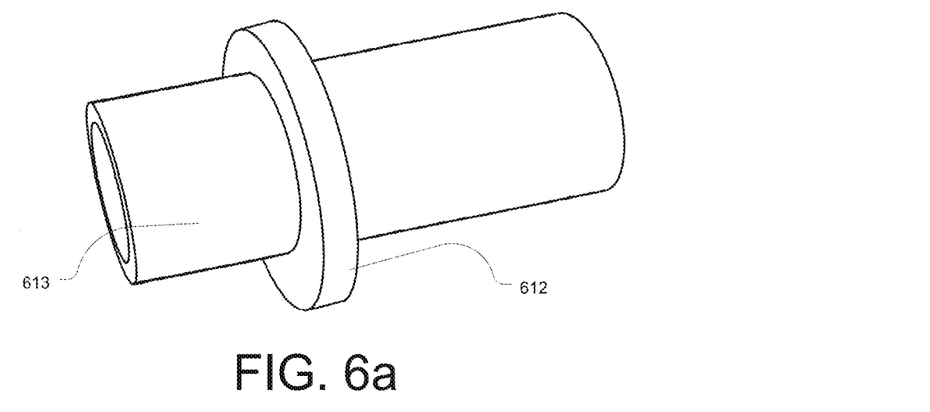
FIGS. 6a-6c illustrate embodiments of a sensor housing according to various implementations of the disclosure and consistent with the teachings and principles of the disclosure.
Figure 6B:
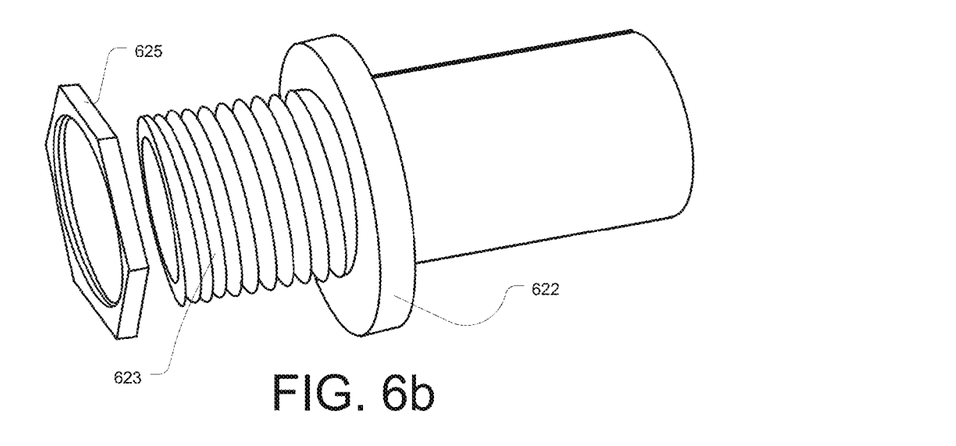
Figure 6C:
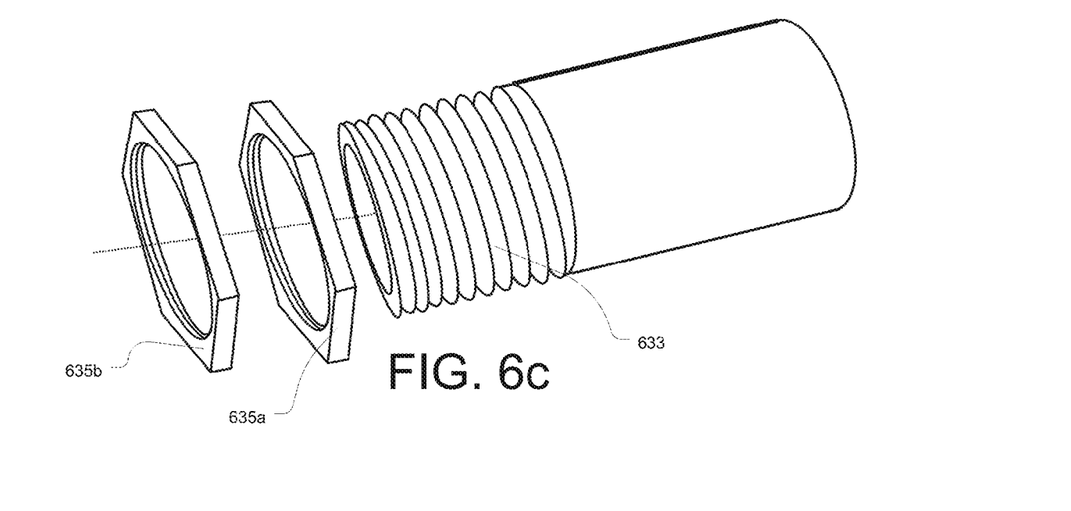

FIGS. 6a-6c illustrate embodiments of a sensor housing attachment structure. FIG. 6a illustrates a simple shoulder attachment structure 612 in combination with a smooth sided insertion portion 613. In an implementation, an adhesive or epoxy, such as a thermally conductive adhesive or epoxy, may be used to hold the sensor in place within the sensor package. In an implementation, an adhesive or epoxy may be used to hold the sensor package in place with respect to (for example) the cover, such as cover 105, 405, or other supporting structure.

FIG. 6b illustrates a shoulder attachment structure 622 in combination with a threaded insertion portion 623, whereby the sensor package may be held in position with respect to (for example) the cover 105, 405 or other supporting structure with corresponding threads of a nut 625. In an implementation, an adhesive or epoxy, such as a thermally conductive adhesive or epoxy, may be used to hold the sensor in place within the sensor package.

FIG. 6c illustrates a sensor housing having a threaded portion 633 and a first nut 635a and second nut 635b. When installed, the first nut 635a may be threaded onto the threaded portion 633. Then the sensor housing may be positioned through an opening in the drive belt cover or other supporting structure. Finally, the second nut 635b may be threaded onto the threaded portion 633, thereby locking the sensor housing into place with respect to the cover or other supporting structure.

FIG. 7 illustrates a detailed view of an installed sensor package 460 as designated by the dashed circle labeled AA in FIG. 4. It should be noted that infrared electromagnetic energy, such as infrared energy, radiating from the drive belt 410 is represented as a wavy line called out as 777. As can be seen in the figure, electromagnetic energy 777 radiates out from the work-heated drive belt 410. The electromagnetic energy 777 may be received into a sensor opening 463 within the sensor housing 461. In the embodiment illustrated, the sensor housing 461 comprises a shoulder attachment structure 422 used in combination with a threaded insertion portion 423, whereby the sensor package may be positioned and held onto the drive belt cover 405 with a nut 425. It will be appreciated that intake or exhaust vents of the host belt driven vehicle or system should be avoided when positioning the sensor package 460 because of the heat generated by such components. Additionally, care should be taken when installing a sensor package 460 to avoid clearance issues with the drive belt 410 and other moving components.

Figure 8:
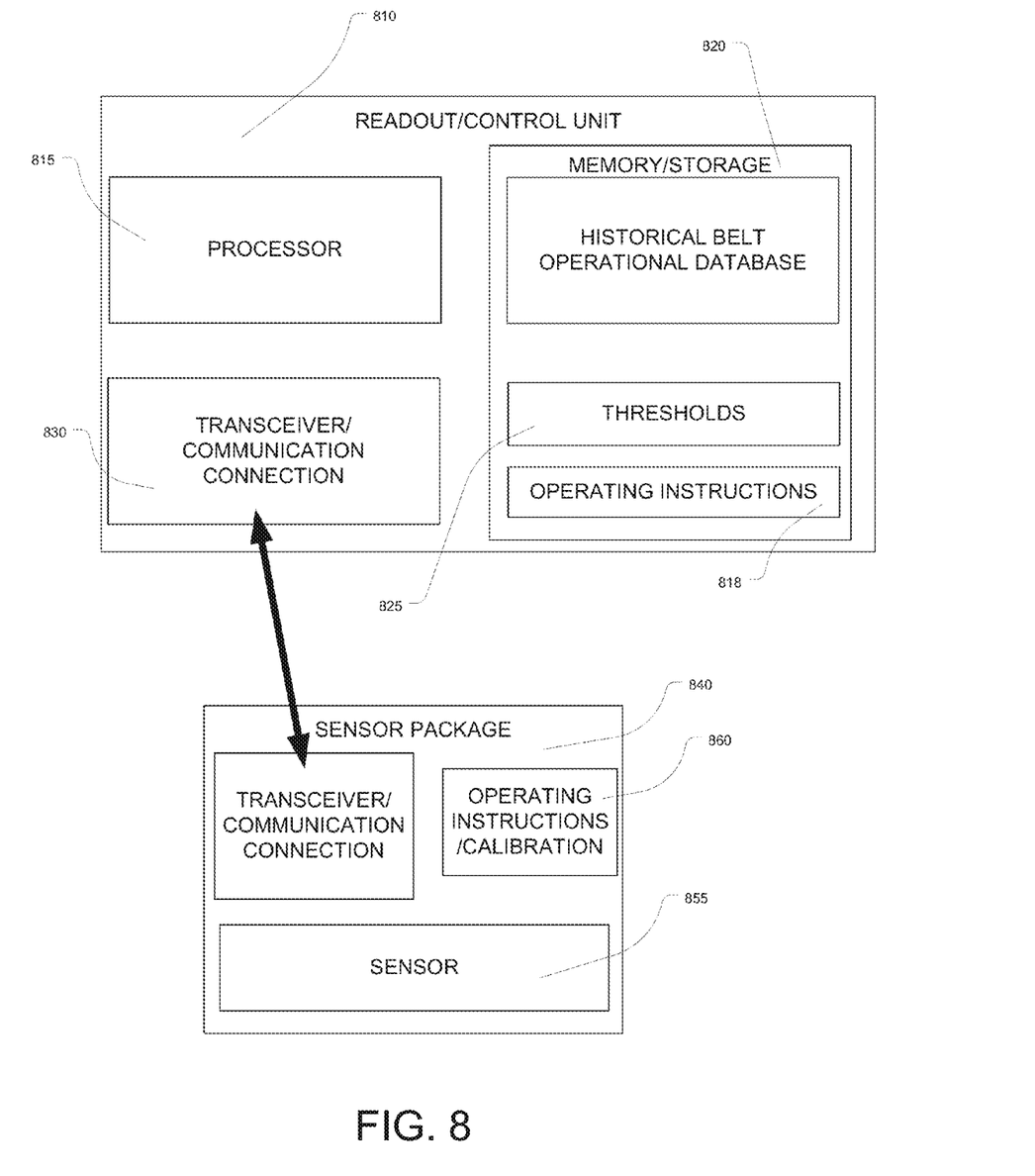
FIG. 8 illustrates a schematic of an embodiment of supporting computer hardware for a belt monitoring system in accordance with the teachings and principles of the disclosure.

FIG. 8 illustrates a schematic of the computer hardware and computing components of a control unit 810 having a display for outputting the data collected by the sensor 855 to a user. A readout control unit 810 may comprise a computer processor 815 for executing computer readable instructions 818 retrieved from computer memory 820. Additionally, the memory 820 may comprise a database of historical drive belt data 823 and a database of operating thresholds 825 regarding the operation of the drive belt monitoring system. The instruction may comprise calibration instructions and alerts for portraying the condition of the system. An embodiment of a readout control unit 810 may further comprise communication devices, such as a control unit transceiver 830 and protocol chip sets for facilitating communication between the sensor 855/sensor package 840 and the readout control unit 810. As discussed above, communication and data transfer may be done wirelessly or wired. Communication between the readout control unit 810 and the sensor package 840 is represented by the two headed arrow connecting the control unit transceiver 830 and a sensor package transceiver 850. Additionally, a sensor package 840 may comprise memory 860 for buffering sensor 855 data and/or storing operating/calibration instructions.

Additionally, in an implementation wherein the sensor package 840 communicates with the readout control unit 810 over a vehicle network, each component may store network identifications in their respective memories.

Figure 9:
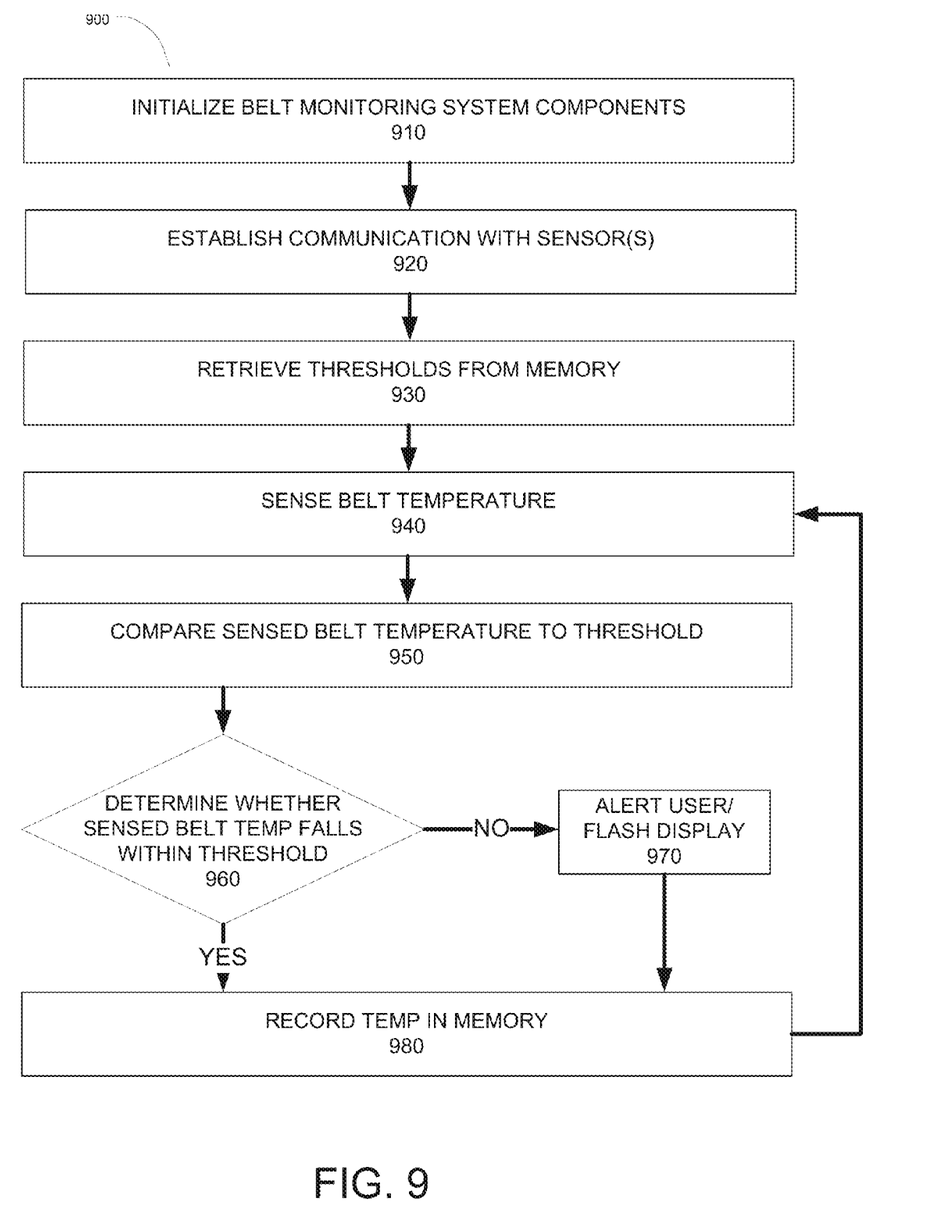
FIG. 9 illustrates a flow chart of an exemplary method according to one implementation consistent with the teachings and principles of the disclosure.

FIG. 9 illustrates a flow chart of an embodiment of a method for the operation of a drive belt monitoring system. During use, the method 900 at 910 may initialize the components of the system, which may comprise a readout control unit and a sensor package.

At 920, the method may establish communication between a belt sensor and the readout control unit. In various embodiments that contain wireless communication functionality, the appropriate wireless chip sets will initialize according to their protocols. In an implementation, a system may comprise a plurality of sensors that will need to be initialized and communicated with by components of the system.

At 930, the method instructs the system to retrieve operation thresholds and parameters from memory. The thresholds may represent ranges or may be single values. Additionally, the thresholds may be updated or may be derived from previous operational sessions that were recorded to memory. In some implementations, the thresholds may be dynamic and may correspond to such conditions as: break-in periods, wear-in periods, ambient temperatures, belt age, and historical belt data.

At 950, the method may instruct the sensor system to sense the belt temperature or electromagnetic radiation emitted from the belt.

At 950, the method may instruct the processor to compare the latest sensed belt temperature of process 940, to the thresholds retrieved from memory in process 930.

At 960, the method may instruct the processor to determine whether the sensed belt temperature falls within the thresholds. If the temperatures do not fall within the expected thresholds, then at 970 the method instructs the system to alert the user through the readout unit. For example, the readout unit may flash in a manner sufficient to gain the attention of a user or operator.

Whether or not, the sense temperature is determined to fall outside the threshold range, at 980 the method instructs the system to record the sensed temperature into the computer memory within the system. The method then returns the system to the sensing process at 940 repeats the processes until the method is stopped or interrupted.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure. Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system for monitoring belt condition in a belt driven machine, the system comprising:
    an infrared sensor disposed in a sensor housing and that is configured to produce a measurement output and measure temperature of a drive belt by reading infrared emissions;
    wherein the sensor housing is configured to position the sensor adjacent to the drive belt without physically contacting the drive belt;
    a readout unit in communication with the sensor that is configured to display sensor data received from the sensor to a user through a display; and
    a heat sink formed as part of the sensor housing, wherein the heat sink dissipates heat away from the infrared sensor and minimizes a thermal gradient across the infrared sensor.

2. The system of claim 1, further comprising a heat sink in thermal communication with the sensor for dissipating heat away from the sensor.

3. The system of claim 2, wherein the heat sink comprises thermally conductive epoxy.

4. The system of claim 2, wherein the sensor, heat sink, and housing form a self-contained sensor package.

5. The system of claim 4, wherein the sensor package further comprises a wireless transceiver configured to communicate wirelessly with the display.

6. The system of claim 5, wherein the wireless transceiver communicates via Bluetooth standards.

7. The system of claim 5, wherein the wireless transceiver communicates via Wi-Fi standards.

8. The system of claim 1, wherein the sensor is configured for sensing infrared electromagnetic energy.

9. The system of claim 1, wherein electronic communication is wired.

10. The system of claim 1, wherein electronic communication is wireless.

11. The system of claim 1, wherein the sensor housing is configured to position the sensor perpendicular to a surface of the belt.

12. The system of claim 1, wherein the sensor housing comprises a threaded portion and is configured to pass through a belt cover.

13. The system of claim 1, further comprising a database of sensed data from the sensor.

14. The system of claim 13, wherein the database of sensed data comprises maximum belt temperatures.

15. The system of claim 1, wherein the display is configured to flash when an operating temperature threshold has been exceeded.

16. A belt driven machine comprising:
    a drive belt;
    a sensor package comprising:
        an infrared temperature sensor configured to produce a measurement output and measure temperature of a drive belt by reading infrared emissions and disposed in a sensor housing, wherein the sensor housing is configured to position the sensor adjacent to the drive belt without physically contacting the drive belt; and
        a heat sink formed as part of the sensor housing that is in thermal communication with the infrared sensor for dissipating heat away from the infrared sensor and minimizing a thermal gradient across the infrared sensor;
    a display in communication with the sensor configured to display sensor data received from the sensor to a user.

17. The belt driven machine of claim 16, wherein the sensor package further comprises a wireless transceiver configured to communicate wirelessly with the display.

18. The belt driven machine of claim 17, wherein the wireless transceiver communicates via Bluetooth standards.

19. The belt driven machine of claim 17, wherein the wireless transceiver communicates via Wi-Fi standards.

20. The belt driven machine of claim 16, wherein the sensor housing comprises a threaded portion and is configured to pass through a belt cover.

21. The belt driven machine of claim 16, further comprising a database of sensed data from the sensor.

22. The belt driven machine of claim 21, wherein the database of sensed data comprises maximum belt temperatures.

* * * * *